(No Model.)
H. HOWSON, Jr.
Egg Beater and Mixer for Kitchen Use.
No. 238,393. Patented March 1, 1881.
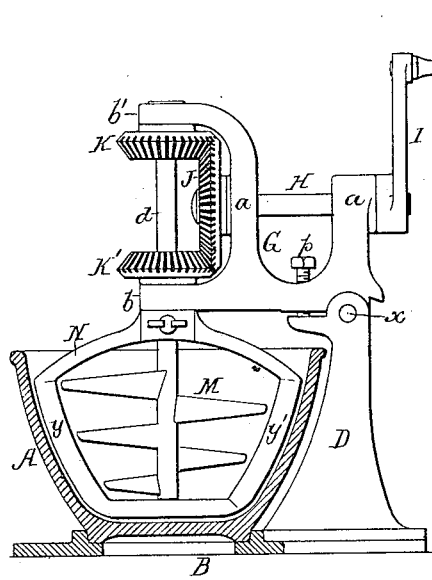
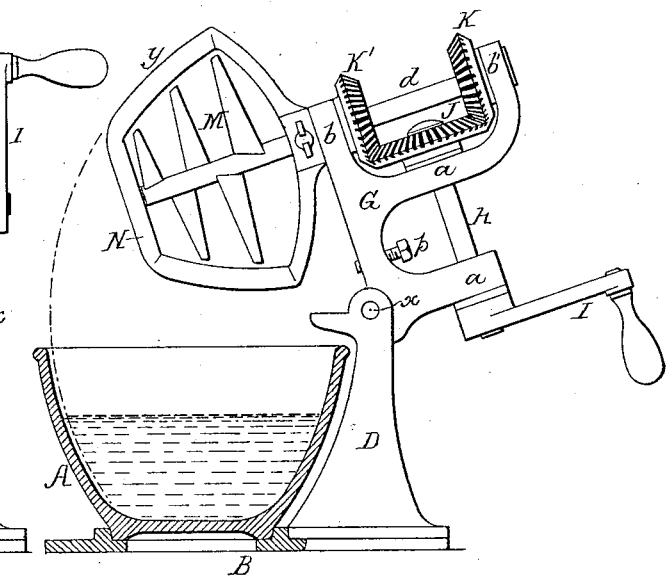
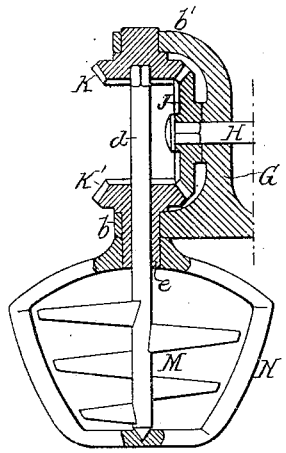
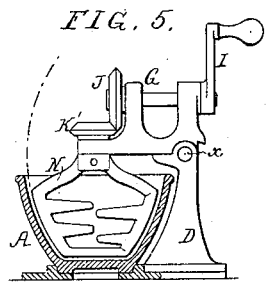
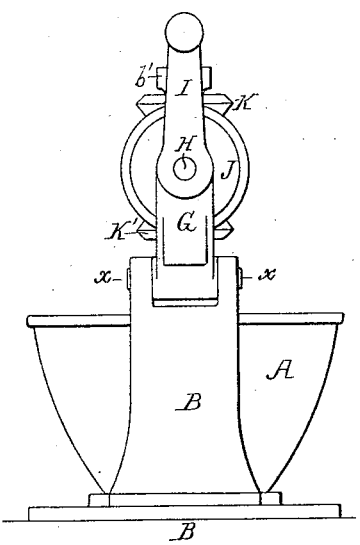
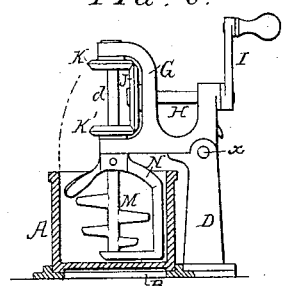
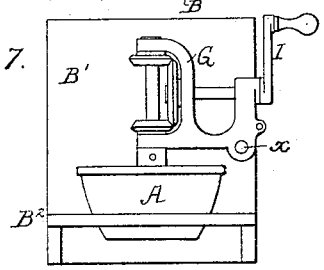
Witnesses.
Harry Smith
Hubert Howson
Inventor.
Henry Howson Jr.
by his Attorneys.
Howson and Sons

UNITED STATES PATENT OFFICE.

HENRY HOWSON, JR., OF PHILADELPHIA, PENNSYLVANIA, ASSIGNOR TO THE AMERICAN MACHINE COMPANY, OF SAME PLACE.

EGG BEATER AND MIXER FOR KITCHEN USE.

SPECIFICATION forming part of Letters Patent No. 238,393, dated March 1, 1881.

Application filed January 26, 1881. (No model.)

*To all whom it may concern:*

Be it known that I, HENRY HOWSON, Jr., a citizen of the United States, residing in Philadelphia, Pennsylvania, have invented an Improvement in Egg Beaters and Mixers for Kitchen Use, of which the following is a specification.

My invention relates to that class of beaters or mixers for culinary purposes in which agitators or dashers, and appliances for operating the same, are combined with a vessel containing the eggs or other substances to be beaten, the main object of my invention being to so pivot a movable frame carrying the agitators, and mechanism for operating the same, to a fixed frame or fixed object in respect to the vessel containing the materials, and to so form the agitators or dashers, that the latter can be withdrawn from the vessel by tilting the movable frame without materially disturbing the said vessel, and without detaching any parts of the machine, the agitators, when thus elevated, being directly above the vessel, into which such of the beaten eggs or other mixed material as may temporarily adhere to the said agitators may fall or be scraped therefrom.

In the accompanying drawings, Figure 1 is a side view of my improved beater or mixer, showing the vessel in section and the agitators contained within the said vessel; Fig. 2, the same as Fig. 1, showing the position of the frame and agitators when the former has been tilted back and the latter have been elevated above the vessel; Fig. 3, a sectional view of part of Fig. 1; Fig. 4, a rear view of the machine; and Figs. 5, 6, and 7, views representing modifications of my invention.

In Figs. 1, 2, 3, and 4, A is a vessel, which may be of metal; but I much prefer an ordinary earthenware bowl, as a vessel of tinned plate or galvanized iron soon becomes worn and corroded. The bottom of the vessel rests in a recess in the base B, the said recess defining the position of the vessel in respect to the agitators. On the base B is a standard, D, and to the latter is pivoted, at $x$, the movable frame G, having suitable bearings, $a\ a$, for the driving-shaft H, which is provided with a handle, I, at one end, the other end of the shaft carrying a bevel-wheel, J, gearing into a wheel, K, which has a square recess adapted to the square end of the shaft $d$ of the agitator or dasher M, the same wheel J gearing into a second wheel, K', on or forming part of the tubular shaft $e$ of the agitator N, the shaft $d$ passing through the tubular shaft, and the latter having its bearing in a projection, $b$, of the movable frame, while the hub of the wheel K has its bearing in the projection $b'$.

My invention may be carried into effect with different kinds of agitators and different kinds of driving appliances; but I prefer two agitators revolving in contrary directions, so as not to disturb the vessel; hence the above-described mechanism, to which I will refer more particularly hereinafter.

It will be observed that the interior of the vessel, as far as the sides are concerned, is made in the arc of a circle, or on a curve approximating to the arc of a circle, earthenware bowls of this shape being quite common.

It will also be observed that the edges of the side wing, $y\ y'$, of the agitator N conform with the bowl, although not in actual contact therewith, and that the edge of the wing $y$ of the agitator, when the latter is in the position Fig. 1, is concentric, or nearly so, with the pivot $x$, so that on turning back the movable frame to the position shown in Fig. 2 the agitator will pass from the bowl without materially disturbing the same.

The limit of the upward movement of the agitators may be determined by suitable stops, this limit being shown in Fig. 2, where it will be observed that the agitators are directly above the bowl, which will thus receive such of the mixed material as may fall or be scraped from the said agitators. After the bowl has been removed from the base and its contents poured out it may be returned to its place, water poured into it, and the movable frame may be then turned down to the position Fig. 1, and both bowl and agitators thoroughly cleansed by turning the handle I.

There should be a suitable stop for determining the extent to which the agitators shall be depressed in the bowl, and I prefer to make this stop adjustable, so that the depression of the agitators may be varied to suit slight variations in the bowl, the adjustable stop consisting, in the present instance, of a set-screw, $p$, passing through the movable frame and resting on the fixed frame.

Locking devices may be used for retaining the movable frame in its two positions; but, as many different appliances may be used for this purpose, it has not been deemed necessary to show any locking mechanism.

It will be seen, on referring to Fig. 3, that the agitator M and its shaft $d$ are made in one piece, the upper square end of the shaft fitting into a corresponding recess in the wheel K, and the lower end having a bearing in the lower portion of the agitator N, which has a central hub fitted to the lower end of the tubular shaft $e$, and secured thereto by a set-screw, on loosening which both of the agitators may be detached, while the gearing retains its place on the movable frame. This is a convenient arrangement, as it permits the ready application to the machine of different kinds of agitators for mixing different kinds of materials required in culinary operations.

I do not desire to restrict myself to any specific construction and arrangement of agitators, beaters, or dashers, for they may be varied to suit the character of the compound to be mixed, many of the numerous agitators shown in patents for egg-beaters, churns, and ice-cream freezers being applicable to my invention, and scrapers, permanent or self-adjusting, such as are to be seen in patents for ice-cream freezers, may be used in connection with the beaters or agitators. Nor is it necessary in all cases to adhere to the system of gearing described above. In Fig. 5, for instance, there is a single beater or dasher combined with two bevel-wheels.

In some cases it may be advisable to so construct the permanent frame of the machine that it can be secured to the wall, as in Fig. 7, where a bracket, B', attached to a wall, has a ledge, B², for supporting the vessel or bowl A, the movable frame being pivoted to the bracket at $x$.

It is not essential that the vessel or bowl should be of the shape shown in Figs. 1 and 2. It may even have vertical sides, as shown in Fig. 6, providing the agitators are constructed substantially in the manner shown in that figure, so that when the frame is to be tilted back the agitators can be adjusted to pass from the vessel without coming in contact with it. I, however, prefer the flaring bowl shown in Figs. 1 and 2.

I claim as my invention—

1. The combination, in an egg beater or mixer, of a fixed frame or bracket with a movable frame pivoted to the said fixed frame and carrying an agitator or agitators, constructed, in respect to the pivot and to the mixing-vessel, as described, so that on tilting back the movable frame the agitators will clear the vessel and occupy a position above the same, as specified.

2. The combination of the fixed frame or bracket, a vessel or bowl having sides made in the arc of a circle, or on a curve approximating thereto, with a movable frame pivoted to the fixed frame, and carrying an agitator or agitators having wings conforming with the vessel, and bearing the relation described to the pivot, all substantially as set forth.

3. The combination, in a beater or mixer, of a fixed frame, for supporting the mixing-vessel, with a movable frame pivoted to the fixed frame, and carrying an agitator or agitators, and mechanism for operating the same, all substantially as specified.

4. The combination of the pivoted frame, carrying the driving-shaft H, and bevel-wheels J, K, and K', with the agitator M, having a shaft passing through the wheel K', and adapted at its upper end to a recess in the wheel K, and with the agitator N, detachably secured to the tubular shaft of the wheel K', so that both agitators can be detached without disturbing the gearing, as described.

In testimony whereof I have signed my name to this specification in the presence of two subscribing witnesses.

HENRY HOWSON, Jr.

Witnesses:
JAMES F. TOBIN,
HARRY SMITH.